United States Patent
Di Bella et al.

(10) Patent No.: US 10,778,064 B1
(45) Date of Patent: Sep. 15, 2020

(54) MAGNETIC BEARING APPARATUS FOR SEPARTING SOLIDS, LIQUIDS AND GASES HAVING DIFFERENT SPECIFIC GRAVITIES WITH ENHANCED SOLIDS SEPARATION MEANS

(71) Applicant: Schlumberger Technology Corporation, Sugar Land, TX (US)

(72) Inventors: John A. Di Bella, Mountainside, NJ (US); Alberto Di Bella, Fort Lauderdale, FL (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 381 days.

(21) Appl. No.: 15/588,132

(22) Filed: May 5, 2017

(51) Int. Cl.
| | |
|---|---|
| *H02K 7/09* | (2006.01) |
| *F04D 13/06* | (2006.01) |
| *F04D 29/048* | (2006.01) |
| *B01D 17/12* | (2006.01) |

(52) U.S. Cl.
CPC ............... *H02K 7/09* (2013.01); *B01D 17/12* (2013.01); *F04D 13/064* (2013.01); *F04D 13/0666* (2013.01); *F04D 29/048* (2013.01)

(58) Field of Classification Search
CPC ...... F04D 13/02; F04D 13/025; F04D 13/026; F04D 13/027; F04D 13/064; F04D 13/0666; F04D 646/048; F04D 29/048; H02K 7/09; B01D 17/12
USPC ...................................................... 310/90.5
See application file for complete search history.

(56) References Cited

U.S. PATENT DOCUMENTS

| | | |
|---|---|---|
| 1,071,042 A | 8/1913 | Fuller et al. |
| 1,347,732 A | 7/1920 | Cooper |
| 3,083,893 A | 4/1963 | Dean et al. |
| 3,276,382 A | 10/1966 | Richter et al. |
| 3,517,821 A | 6/1970 | Monson et al. |
| 3,650,581 A | 3/1972 | Boden et al. |
| 3,786,996 A | 1/1974 | Richter |
| 3,810,635 A | 5/1974 | Richter |
| 4,478,712 A | 10/1984 | Arnaudeau |
| 4,834,887 A * | 5/1989 | Broughton ................ B04C 3/00 209/725 |
| 5,084,189 A | 1/1992 | Richter |

(Continued)

FOREIGN PATENT DOCUMENTS

| | | |
|---|---|---|
| CH | 563186 A5 | 6/1975 |
| DE | 1186412 B | 1/1965 |

OTHER PUBLICATIONS

International Search Report dated Sep. 12, 2018, issued in corresponding International Patent Application No. PCT/US2018/031026, citing the above references.

(Continued)

*Primary Examiner* — Quyen P Leung
*Assistant Examiner* — Eric Johnson
(74) *Attorney, Agent, or Firm* — Hauptman Ham, LLP; Ronald G. Embry, Jr.

(57) ABSTRACT

An axial flow-type pump apparatus with magnetic bearings for separating immiscible flowable materials having different specific gravities and a discharge manifold connected to the fluid pump for drawing off the flowable separated materials with greatly improved efficiency, and pump and apparatus longevity.

14 Claims, 4 Drawing Sheets

(56) References Cited

U.S. PATENT DOCUMENTS

| | | | | |
|---|---|---|---|---|
| 5,252,229 A | * | 10/1993 | Rojey | B01D 17/0205 |
| | | | | 210/512.1 |
| 5,505,594 A | * | 4/1996 | Sheehan | F04D 3/02 |
| | | | | 415/72 |
| 5,729,066 A | * | 3/1998 | Soong | F16C 32/0451 |
| | | | | 310/51 |
| 6,927,517 B2 | * | 8/2005 | Brunet | F16C 32/0442 |
| | | | | 310/180 |
| 9,527,014 B1 | * | 12/2016 | Culler | C02F 1/385 |
| 2007/0063594 A1 | | 3/2007 | Huynh | |
| 2008/0078618 A1 | | 4/2008 | Lee et al. | |
| 2009/0008342 A1 | | 1/2009 | Nilsen et al. | |
| 2012/0013125 A1 | * | 1/2012 | Myers | H02K 7/09 |
| | | | | 290/52 |
| 2013/0195695 A1 | | 8/2013 | Van Dam et al. | |
| 2015/0275891 A1 | | 10/2015 | Chong | |

OTHER PUBLICATIONS

Final Office Action dated Jul. 12, 2019, in U.S. Appl. No. 15/588,168, filed May 5, 2017.
Non-Final Office Action dated Nov. 1, 2018, in U.S. Appl. No. 15/588,168, filed May 5, 2017.
International Search Report and Written Opinion issued in PCT Application PCT/US2018/031146, dated Nov. 18, 2018 (12 pages).
International Preliminary Report on Patentability issued in PCT Application PCT/US2018/031026, dated Nov. 14, 2019 (11 pages).
International Preliminary Report on Patentability issued in PCT Application PCT/US2018/031146, dated Nov. 14, 2019 (9 pages).

* cited by examiner

PRIOR ART

FIG. 4

PRIOR ART

Fig. 5
(PRIOR ART)

MAGNETIC BEARING APPARATUS FOR SEPARTING SOLIDS, LIQUIDS AND GASES HAVING DIFFERENT SPECIFIC GRAVITIES WITH ENHANCED SOLIDS SEPARATION MEANS

BACKGROUND OF THE INVENTION

1. Field of the Invention

The present invention relates generally to the field of devices for separating flowable material from immiscible fluid and solid mixtures. More specifically the present invention relates to an axial flow pump apparatus for separating immiscible fluids and solids having different specific gravities, including separating particulate solids from liquids, and solids from other particulate solids, liquids from liquids, and gases from liquids.

2. Description of the Prior Art

There have long been separating devices for separating materials in mixtures having different specific gravities. Yet none have satisfactorily and economically separated particulate solids, liquids and/or gases from liquids without a pressure drop and with a small footprint, despite the need for such devices.

Separation of contaminants including solids, liquids and gases from a fluid stream is needed in virtually every industry such as petroleum, sewage, manufacturing and mining, to name a few. In the oil and gas industry, produced water comprises over 98% of the total volume of exploration and production wastewater produced in the United States. Produced water is the associated water that is produced along with oil and/or gas during normal production operations. Produced water is not a marketable product, so it must be disposed of (with this said, many companies are now seeking ways to purify the water to drinking water standards). Produced water may be contaminated with either oil, solids, gases or a combination thereof. In many land-based production operations, the produced water is either injected into a disposal well or is reinjected into a producing well to maintain reservoir pressure and enhance oil recovery. Produced water must be treated prior to reinjection because many of the components can be harmful to the formation or the associated piping. In the case of suspended oil associated with the produced water, it can be separated and sold to generate revenue for the facility.

Millions of gallons of diesel fuel and jet fuel are transported by ships to various parts of the world for refueling of planes at sea and for delivery to ports. These transport ships contain many compartments for holding the diesel and jet fuel. While the fuels are in these compartments, they may become contaminated with water. However, fuel contaminated with water is unsuitable for use. Thus, at the point of delivery, any fuel contaminated with water will be rejected, and must be returned to the point from which it was shipped for refinement. The re-transportation and refinement of the fuel is both costly and time consuming.

Centrifugal separators for the separation of immiscible fluids of different specific gravities are well known. These centrifugal separators employ a rotor for rotating the mixture of fluids, causing the fluid having the lighter specific gravity to migrate to the center of the rotating mass, and the fluid having the heavier specific gravity to migrate to the perimeter, where it can be extracted. Examples of such centrifugal separators are disclosed in U.S. Pat. No. 4,478,712 to Arnaudeau, U.S. Pat. No. 3,517,821 to Monson et al., German patent No. 1,186,412 to Groppel, and Swiss patent No. 563,186 to Reynolds. Flow pumps and blowers built on the same general principle are disclosed in U.S. Pat. No. 1,071,042 to Fuller and U.S. Pat. No. 3,083,893 to Dean, respectively, and in U.S. Pat. Nos. 3,276,382, 3,786,996, and 3,810,635.

However, none of these devices provides a sufficiently great G-force in a continuous flow and without a significant pressure drop to create a well-defined boundary between the fluids as they separate under centrifugal force, e.g. by forcing the fluid having the lighter specific gravity to a tight core in the center of a tube of the fluid having the heavier specific gravity, whereby the fluid having the heavier specific gravity can be drawn off in a single pass without the need for additional treatment of the fluid having the lighter specific gravity. Further, none of these devices provides an adjustable mechanism for drawing off the fluid having the heavier specific gravity. It is the solution of these problems to which the present invention is directed.

Also if granulated solids are removed through a pipe at the mixture periphery along the manifold, a substantial percentage of the granulated solids are removed together with a small amount of liquid which permits the solid granules to flow.

Thus, a method and apparatus for separating immiscible fluids having different specific gravities by providing high swirl velocity of the fluids while maintaining a high volume flow are needed.

SUMMARY OF THE INVENTION

The foregoing and other objects of the invention are achieved by provision of an axial flow-type pump having magnetic bearings for separating immiscible fluids having different specific gravities and a discharge manifold connected to the fluid pump for drawing off the separated fluids, solids or gases. The fluid pump employs a rotatable impeller mechanism having a hollow core and a decreasing axial pitch in the direction of fluid flow. The fluid interface between the pump and the discharge manifold is adjustable, so that the discharge of the fluid having the heavier or lighter specific gravity can be adjusted.

Methods described herein include introducing fluids into the inlet end of a rotatable drum and impeller supported by magnetic bearings to produce a high velocity swirling action in the fluids and a low pressure area along the longitudinal axis of the flow line, to generate a high centrifugal force as the fluids move axially, thereby throwing the fluid having the heavier specific gravity to the perimeter, and using a discharge manifold in accordance with the invention to draw off the separated fluids, solids or gases.

A better understanding of the disclosed embodiments will be achieved when the accompanying detailed description is considered in conjunction with the appended drawings in which like reference numerals are used for the same parts as illustrated in the different figures.

An apparatus is provided for separating a fluid having a lighter specific gravity from a fluid having a heavier specific gravity and for separating fluids having lighter specific gravity from solids having a heavier specific gravity, including a fluid passage for receiving fluids and solids of a mixture stream to be separated having a longitudinal axis and rotatably mounted within an apparatus housing, the fluid passage including a tubular rotatable drum within a rotor rotatably mounted within the housing, the rotatable drum having a drum inlet and a drum outlet; a discharge conduit connected to the drum outlet; rotatable impeller positioned in the fluid passage for imparting a swirling axial movement to the fluids in the fluid passage downstream of the impeller and in the discharge conduit and causing the fluids and solids having the heavier specific gravity to migrate outwardly to form a radial array of circumferential layers of progressively heavier specific gravities from the center of the mixture stream outwardly; a discharge structure connected to the discharge conduit for selectively discharging the fluids and solids of each given layer of the mixture stream; the impeller structure including at least two concentric helical blades each having an inlet end and an outlet end, and the helical blades each terminating short of the longitudinal axis of the fluid passage to define a hollow core through which the fluids pass; and a solids separation mechanism including an inlet gap defined between the drum inlet and the housing and an inlet solids receiving chamber defined between the rotor and the housing and having an inlet solids discharge port for draining solids collected in the inlet solids receiving chamber, and an outlet gap defined between the outlet gap and the housing and an outlet solids receiving chamber defined between the rotor and the housing and having an outlet solids discharge port for draining solids collected in the outlet solids receiving chamber.

The apparatus may also include an inlet discharge pipe in fluid communication with the inlet solids discharge port. The apparatus may also include an outlet discharge pipe in fluid communication with the outlet solids discharge port.

An apparatus is still further provided for separating a fluid having a lighter specific gravity from a fluid having a heavier specific gravity and for separating fluids having lighter specific gravity from solids having a heavier specific gravity, including a fluid passage for receiving fluids and solids of a mixture stream to be separated having a longitudinal axis and rotatably mounted within an apparatus housing, the fluid passage including a tubular rotatable drum within a rotor rotatably mounted within the housing, the rotatable drum having a drum inlet and a drum outlet; a discharge conduit connected to the drum outlet; rotatable impeller positioned in the fluid passage for imparting a swirling axial movement to the fluids in the fluid passage downstream of the impeller and in the discharge conduit and causing the fluids and solids having the heavier specific gravity to migrate outwardly to form a radial array of circumferential layers of progressively heavier specific gravities from the center of the mixture stream outwardly; a discharge structure connected to the discharge conduit for selectively discharging the fluids and solids of each given layer of the mixture stream; the impeller structure including at least two concentric helical blades each having an inlet end and an outlet end, and the helical blades each terminating short of the longitudinal axis of the fluid passage to define a hollow core through which the fluids pass; and a solids separation mechanism including an inlet gap defined between the drum inlet and the housing and an inlet solids receiving chamber defined between the rotor and the housing and having an inlet solids discharge port for draining solids collected in the inlet solids receiving chamber. The apparatus may also include an inlet discharge pipe in fluid communication with the inlet solids discharge port.

An apparatus is yet still further provided for separating a fluid having a lighter specific gravity from a fluid having a heavier specific gravity and for separating fluids having lighter specific gravity from solids having a heavier specific gravity, including a fluid passage for receiving fluids and solids of a mixture stream to be separated having a longitudinal axis and rotatably mounted within an apparatus housing, the fluid passage including a tubular rotatable drum within a rotor rotatably mounted within the housing, the rotatable drum having a drum inlet and a drum outlet; a discharge conduit connected to the drum outlet; rotatable impeller positioned in the fluid passage for imparting a swirling axial movement to the fluids in the fluid passage downstream of the impeller and in the discharge conduit and causing the fluids and solids having the heavier specific gravity to migrate outwardly to form a radial array of circumferential layers of progressively heavier specific gravities from the center of the mixture stream outwardly; a discharge structure connected to the discharge conduit for selectively discharging the fluids and solids of each given layer of the mixture stream; the impeller structure including at least two concentric helical blades each having an inlet end and an outlet end, and the helical blades each terminating short of the longitudinal axis of the fluid passage to define a hollow core through which the fluids pass; and a solids separation mechanism including an outlet gap defined between the outlet gap and the housing and an outlet solids receiving chamber defined between the rotor and the housing and having an outlet solids discharge port for draining solids collected in the outlet solids receiving chamber. The apparatus may also include an outlet discharge pipe in fluid communication with the outlet solids discharge port.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Described herein are methods and apparatus for separating immiscible fluids having different specific gravities with no contact friction at apparatus bearings, so that much greater rotational speeds can be reached and with less energy input for high efficiency. In some embodiments, the methods and apparatus separate liquids, solids and/or gases from other liquids and from each other in immiscible fluids having different specific gravities with only one treatment stage. In the apparatus described herein, mechanical wear of bearings and seals is greatly reduced or eliminated and the life of the apparatus is increased as much as ten fold or more relative to conventional separators. The apparatus described herein separates immiscible fluids and solids having different specific gravities, with solids separated at the inlet and outlet of a tubular rotating drum through gaps between the drum and housing to enhance solids separation efficiency, in addition to separating solids in a separation manifold in fluid communication with the drum. Gaps are provided between the drum and rotor and the apparatus housing and manifold to permit the rotor and drum to rotate with maximum efficiency. In this way, less sand is removed with oil, water and other liquids. Also, a smaller diameter manifold removal pipe for solids can be used so that less liquid is removed with the solids, and so that less sand or other granules are present in the mixture stream to damage apparatus surfaces and seals, and smaller grains of sand, for example micron sidez grains, are removed from the mixture stream.

Detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Magnetic bearings provide a completely different approach to the support of rotating equipment. Magnetic bearings are a non-contacting technology, which has negligible friction and no wear. As a result, no contact friction, such as from prior abutting ball bearings, the friction resistance to rotation is eliminated and much greater rotational speeds can be reached with high separation efficiency, and so that mechanical wear of bearings is greatly reduced and the life of the separator apparatus is increased as much as ten fold or more.

The magnetic bearings have several other properties which improve the operation of the separator. The magnetic bearings can be immersed in the fluid so that seals are not required to protect the bearings. The magnetic bearings are insensitive to pressure so that high-pressure operation can be achieved very easily. High temperature operation is also easily achieved. The magnetic bearings do not require lubrication so that maintenance costs are reduced.

This vast improvement discovered by applicant using magnetic bearings has been entirely unrecognized in the materials separation industry. Applicant has found that the use of magnetic bearings to support the pump and spinning cylindrical drum increases the attainable cartridge rotational speed by as much as 4000 revolutions per minute (rpm), or greater. As a result, much larger centrifugal forces are developed in the composite fluid than have been possible with previous separators which significantly increases separation performance so that, not only liquids having different specific gravities, but liquids, gases and particulate solids can be separated. Examples of mixture combinations of material phase components which can be separated from the mixture by the high speed separator apparatus are Liquid/liquid
Liquid/solid
Liquid/liquid/solid
Liquid/solid/solid
Liquid/liquid/gas
Liquid/solid/gas
Liquid/liquid/solid/gas
Liquid/solid/solid/gas
Liquid/gas where solid/solid combinations are particulate solids moving within a flow stream.

The higher rotational speed also increases the quantity of fluid processed and ultimately separated by the separator. The higher rotational speed virtually eliminates any potential pressure loss of the fluid passing through the separator and actually creates an increase in the pump outlet pressure.

Applicant has found that greater separation efficiency can be achieved by providing separation means at the rotating drum inlet and outlet, where rotational velocity is highest and solids are driven outwardly with greatest centrifugal force. Solids removal is enhanced with the higher rotation speeds achieved with magnetic bearings. A gap between the rotating drum and the housing and manifold at both the drum inlet and the drum outlet is necessarily provided to permit drum rotation without friction resistance. Solids can tend to enter this gap and collect in the space between the rotor surrounding the drum and the housing.

Described herein are additional solids separation means at the drum inlet and drum outlet to enhance the efficiency of solids separation and the rotational efficiency of the drum so that friction resistance to rotation is eliminated and much greater rotational speeds can be reached with high separation efficiency.

The inlet and outlet solids separation mechanisms at the rotatable drum inlet and drum outlet, to greatly increases solids removal efficiency and apparatus operation. Inlet solids separation mechanism includes an annular inlet gap between the housing and drum inlet of at least 1/20,000 inch, opening into an annular inlet solids receiving chamber located between the rotor and the housing. An inlet solids discharge port opens from inlet solids receiving chamber into a radial and downwardly protruding inlet discharge pipe. By the same token, the outlet solids separation mechanism includes an annular outlet gap between the housing and the drum outlet of at least 1/20,000 inch, opening into an annular outlet solids receiving chamber between the rotor and the housing. An outlet solids discharge port opens into a radial and downwardly protruding outlet discharge pipe.

Reference is now made to the drawings, wherein like characteristics and features of the present invention shown in the various FIGURES are designated by the same reference numerals.

First Preferred Embodiment

An apparatus 10 is disclosed for separating immiscible fluids and solids having different specific gravities from a liquid and solids mixture in FIGS. 1-5.

Figure 1:
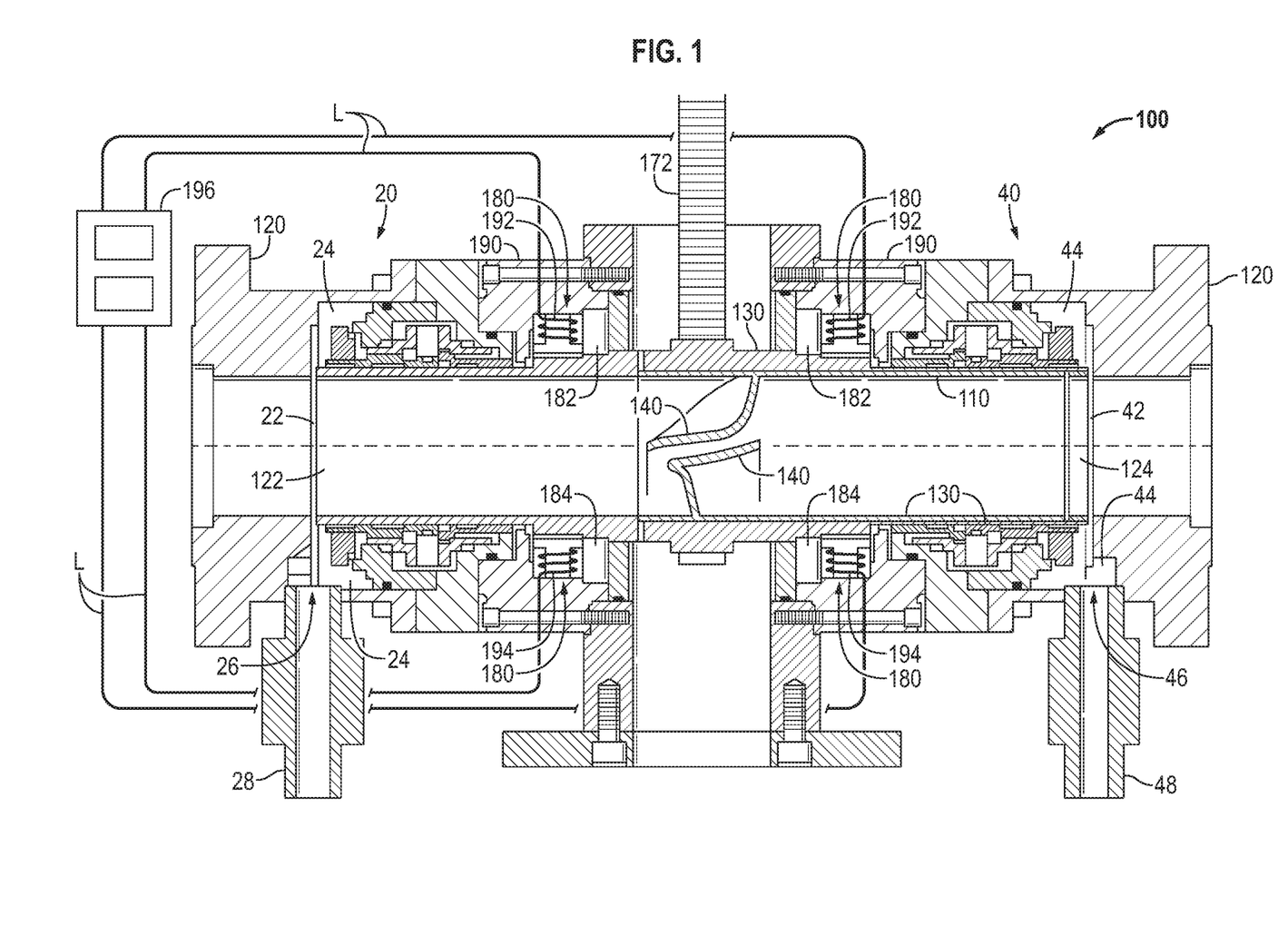
FIG. 1 is a cross-sectional side view of a fluid axial flow type pump.
Figure 2:
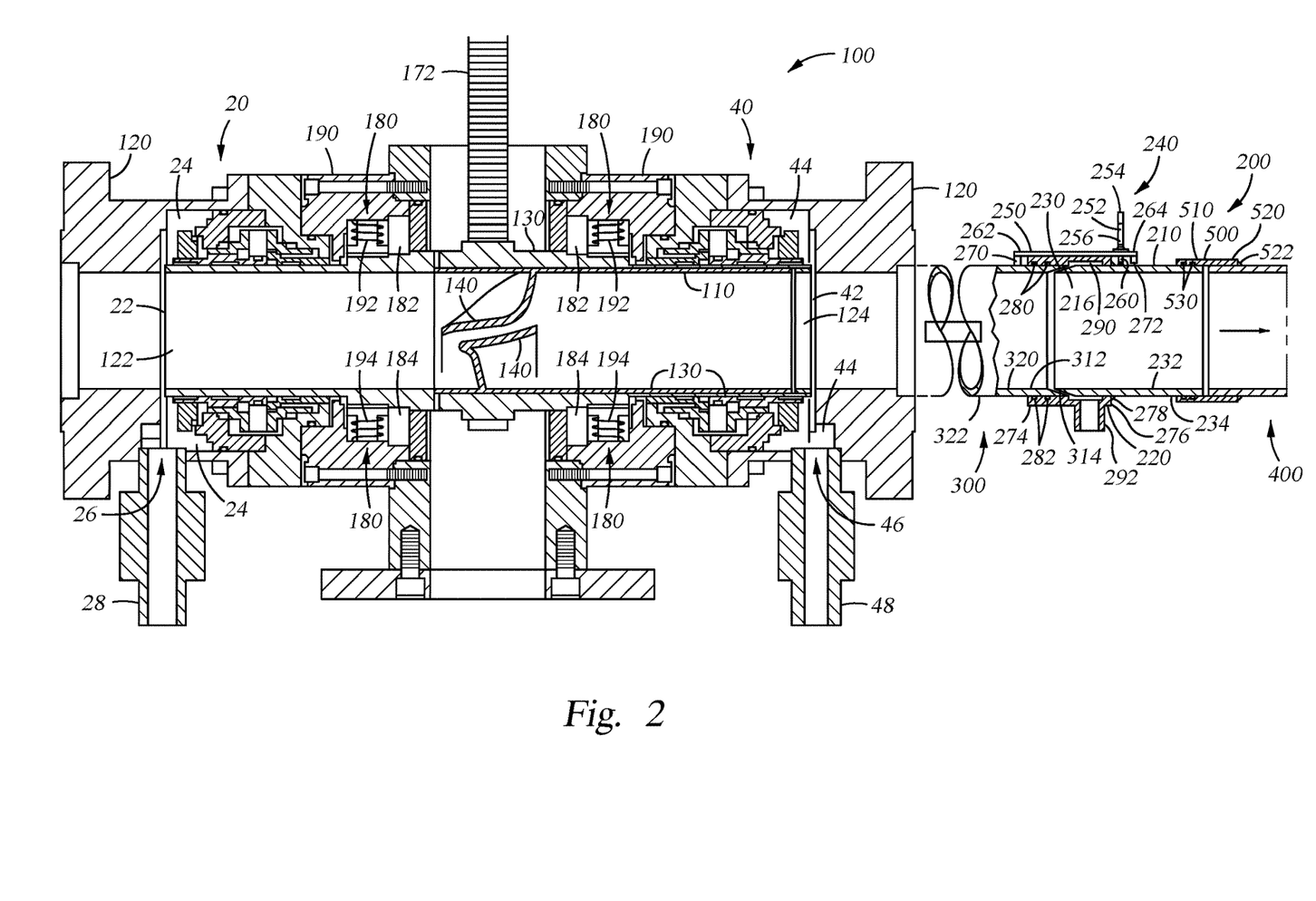
FIG. 2 is a cross-sectional view of the pump of FIG. 1 with a discharge apparatus.
Figure 3:
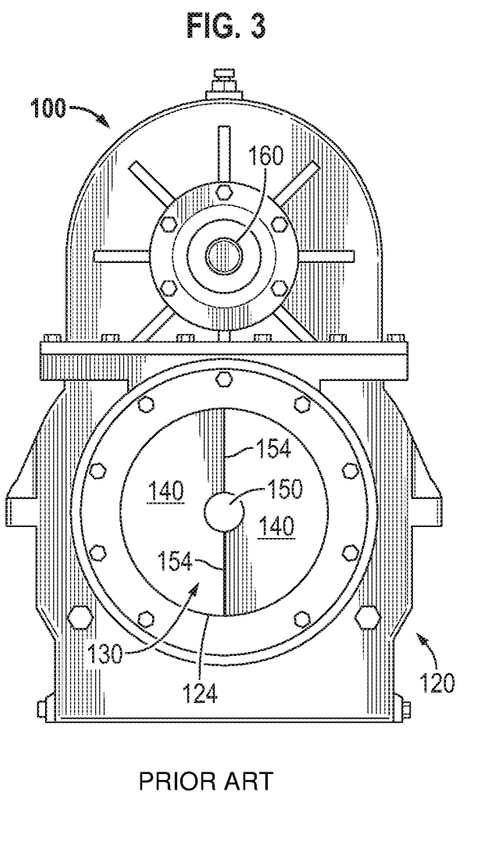
FIG. 3 is a right side elevational view of a prior art pump.
Figure 4:
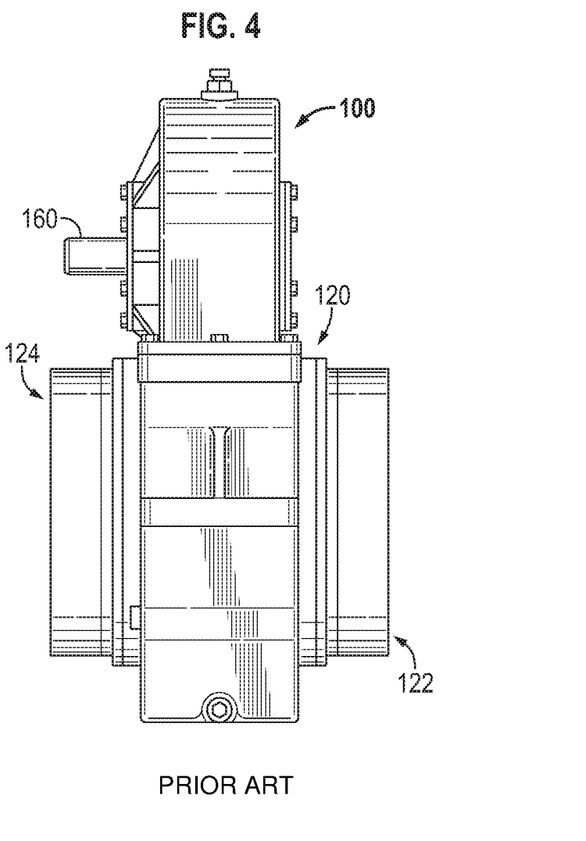
FIG. 4 is a front plan view of the prior art pump of FIG. 3.

Separator 10 comprises a fluid flow device 100 (FIG. 2) of the axial pump type having a discharge manifold 200, and an upstream discharge conduit 300 connecting fluid flow device 100 and discharge manifold 200, as disclosed in U.S. Pat. No. 5,084,189 issued to Richter on Jan. 28, 1992, the contents of which are incorporated by reference. Discharge manifold 200 can be fluid connected to a downstream discharge conduit 400 for carrying the fluid having the lighter specific gravity. As illustrated in FIGS. 1 and 2, axial pump 100 comprises fluid passage means such as a rotatable conduit or cylindrical rotatable drum 110 mounted for rotation with in a housing 120 and having two ends in the form of a drum inlet 122 and a drum outlet 124. Drum 110 provides a passageway for the fluids and solids. Drum 110 is part of a rotor 130 and is provided with an impeller comprising helical blades 140 formed integrally with drum 110 to rotate with drum 110.

Referring to FIG. 1, a primary inventive feature of the present disclosure is the provision of magnetic bearings 180 for axially positioning and rotatably supporting drum 110 within housing 120. The magnetic bearings 180 preferably include a bearing stator 190 through which rotor 130 passes. Stator 190 includes an upper winding 192 directly above the rotor 130 and a lower winding 194 directly below the rotor 130, the current in each of the windings 192 and 194 being connected with leads L to and independently controlled by a microprocessor 196 running a control algorithm program.

Independent upper and lower rotor position sensors 182 and 184, respectively, are also connected to the microprocessor 196 and feed rotor 130 position information to the algorithm program to provide real time feedback to permit continuous adjustment of the current through upper and lower windings 192 and 194.

Inlet and outlet solids separation mechanisms 20 and 40 preferably are provided at the rotatable drum inlet 122 and drum outlet 124, to greatly increase solids removal efficiency and apparatus operation effectiveness. Inlet solids separation mechanism 20 includes an annular inlet gap 22 between the housing 120 and drum inlet 122 of at least 1/20,000 inch, opening into an annular inlet solids receiving chamber 24 located between the rotor 130 and the housing 120. An inlet solids discharge port 26 opens from inlet solids receiving chamber 24 into a radial and downwardly protruding inlet discharge pipe 28. By the same token, outlet solids separation mechanism 40 includes an annular outlet gap 42 between the housing 120 and drum outlet 122 of at least 1/20,000 inch, opening into an annular outlet solids receiving chamber 44 between the rotor 130 and the housing 120. An outlet solids discharge port 46 opens into a radial and downwardly protruding outlet discharge pipe 48.

As the drum 110 rotates, the blades 140 rotate the mixture stream fluids and solids within the drum 110 so that the solids, which have the highest specific gravity are propelled against the drum 110 wall and the fluids stratify into radial layers of progressively increasing specific gravity from the center of the stream outwardly. As the blades 140 propel the flowing mixture stream through the drum 110, some of the solids layer S enters the inlet and outlet solids receiving chambers 24 and 44 through the inlet and outlet gaps 22 and 42, respectively, and is discharged through respective inlet and outlet discharge pipes 28 and 48. Additional solids discharge is provided at the solids discharge pipe in manifold 200 (FIG. 2).

Remaining Features of the First Preferred Embodiment

Figure 5:
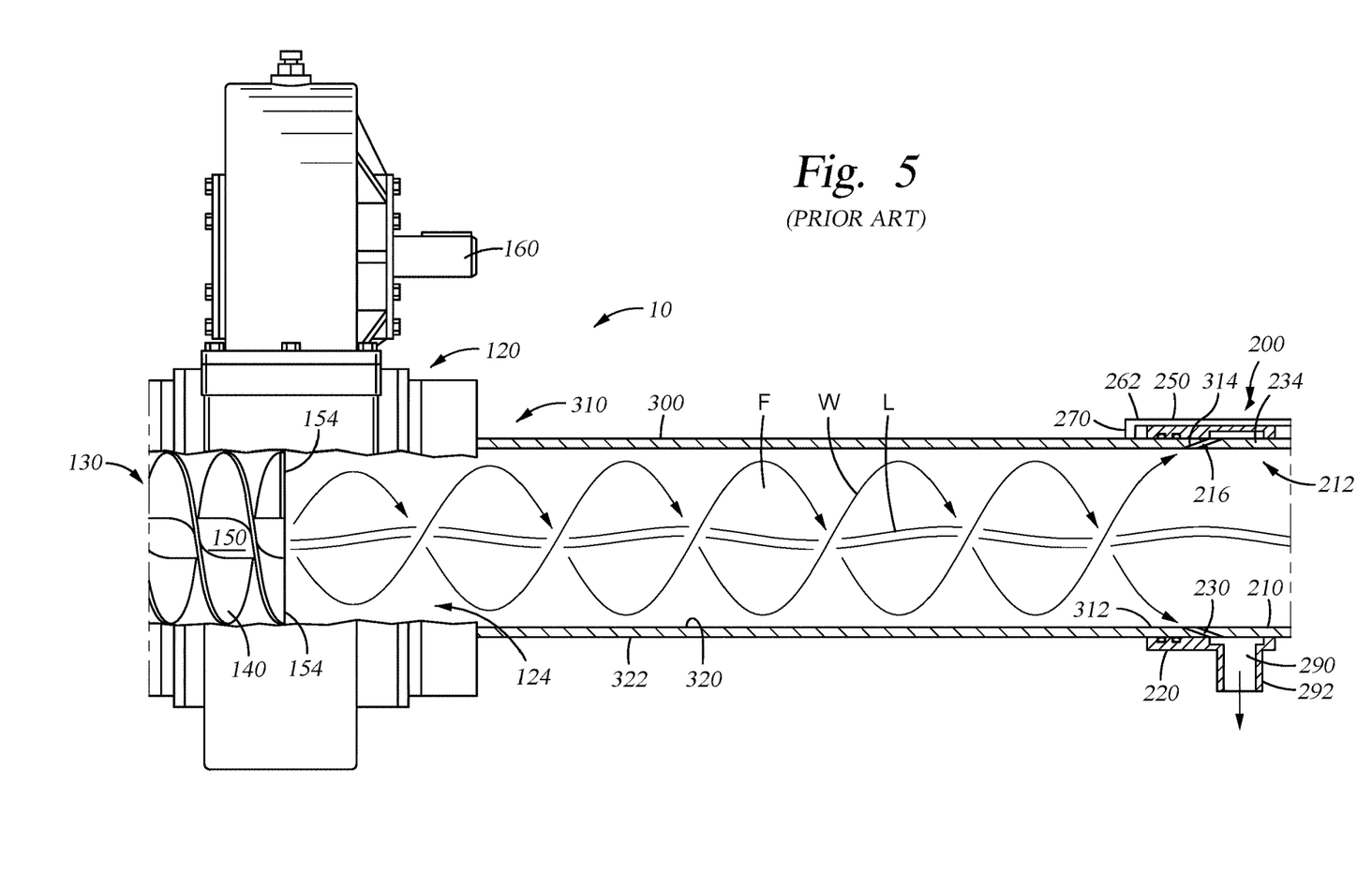
FIG. 5 is a partial cross-sectional view of a prior art axial pump and discharge manifold of FIG. 1, showing the fluid vortex created by the pump and the manner in which the fluid and solids having a heavier specific gravity, and fluids and solids having a lighter specific gravity are drawn off at the discharge manifold.

Referring to FIG. 2, blades 140 extend radially inwardly short of the longitudinal axis of drum 110 to provide or define an axial hollow core or opening 150. As blades 140 rotate, core 150 will initiate a low pressure area in the center of the flow line, with the high velocity, higher specific gravity fluid on the outer perimeter. FIG. 5 illustrates this flow pattern in a prior art axial flow pump, as shown with respect to water W in FIG. 5 to provide an inherent separation of the fluids, solids and/or gases. Where the lower specific gravity fluid, solid or gas, L in FIG. 5, gets channeled to the center of the fluid stream while the higher specific gravity fluid, solid or gases, F in FIG. 5 gets channeled to the outside of the fluid stream, again providing an inherent separation of the fluids.

Blades 140 preferably have a higher axial pitch at their inlet ends 152 which is gradually reduced to a smaller axial pitch at their outlet ends 154. Preferably, blades 140 have an axial pitch of approximately ten inches at their inlet ends 152 and an axial pitch of approximately five inches at their outlet ends 154. Although these axial pitches will provide the desired volume and swirl velocity, they can be varied without departing from the spirit of the invention. These units are scalable in design and thus can be manufactured to various sizes to handle different flow rates.

Referring again to FIG. 2, blades 140 preferably will supply a flow volume of ten inch axial pitch, and as the helical pitch reduces to five inches, the swirl velocity increases greatly to provide a tight swirling axial movement of the fluids. With the reduction in pitch of blades 140, the swirl velocity and the centrifugal force are both doubled in comparison to blades of uniform pitch.

Because of their configuration, each of blades 140 is in contact with the fluids for a complete revolution. Continuous contact with the fluids for one complete revolution is necessary to change the swirl velocity and provide a smooth transition from low to high centrifugal action. Blades 140 also create less turbulence than, for example, shorter impeller blades would. This is a great advantage when one of the fluids is oil or another liquid which is easily emulsified, as the reduced turbulence will prevent emulsification.

Axial pumps such as pump 100 are normally powered and require a suitable power source such as a motor (not shown) for rotating an input shaft 160 drivingly connected to gearing 170 or a drive belt 172. As noted above, suitable magnetic bearing means 180 are employed for axially positioning and rotatably supporting drum 110 within housing 120. These bearings are replaced by the magnetic bearings 180. A detailed description of the structure associated with the drive mechanism for pump 100 can be found in U.S. Pat. Nos. 3,786,996 and 3,810,635, which are specifically incorporated herein by reference, and made a part hereof as though reproduced herein, with respect to their descriptions of the structure associated with the drive mechanism for a pump.

Upstream discharge conduit 300 has an inlet end 310 and an outlet end 312. Inlet end 310 can be fluid connected by conventional means to the tank or other container holding the fluids to be separated, at the point of delivery of the fluids. Drum 110 (FIG. 2) is conventionally fluid connected at its outlet end 154 to the inlet end 310 of upstream discharge conduit 300. Outlet end 312 tapers outwardly, that is, its outer edge 314 tapers outwardly in the downstream direction from the inner surface 320 to the outer surface 322 of upstream discharge conduit 300, for a purpose to be described hereinafter. The angle of the taper, that is, the angle between edge 314 and outer surface 322 preferably is approximately 12 degrees, to obtain optimum results.

Discharge manifold 200 comprises an axially movable conduit section 210 having substantially the same inner diameter as drum 110, and having an inlet end 212 and an outlet end (FIG. 2). An upstream seal 220 is affixed to conduit section 210 for sealingly connecting conduit section 210 at its inlet end 212 to the outlet end 312 of upstream discharge conduit 300, and permitting relative axial movement of conduit section 210 and upstream discharge conduit 300.

Inlet end 212 tapers outwardly, i.e., its outer edge 230 tapers outwardly in a downstream direction from the inner surface 232 to the outer surface 234 of conduit section 210 for mating engagement with tapered outer edge 314 of upstream discharge conduit 300. For this purpose, the angle formed between outer edge 230 and inner surface 232 of conduit section 210 is substantially the same as the angle formed between outer edge 314 and outer surface 322 of upstream discharge conduit 300.

An adjustment assembly 240 is provided for moving conduit section 210 into and out of engagement with outlet end 312 of upstream discharge conduit 300 for respectively closing and opening discharge manifold 200.

Adjustment assembly 240 comprises a platform 250 extending to discharge manifold 200 upstream of outlet end 312 of upstream seal 220. Upstream seal 220 includes seal members 280, disposed in grooves 282 near upstream end 274 of upstream seal 220, to seal against the outer surface 322 of upstream discharge conduit 300. An operating handle 252 is provided for operating discharge manifold 200.

Handle 252 has a distal end 254 extending outwardly from platform 250 and a proximal end 256 by which it is pivotally mounted to platform 250. A link 260 is pivotally mounted at one end to moveable conduit section 210 and pivotally mounted at the other end to proximal end 256 of handle 250 through a slot (not shown) in platform 250. As handle 252 is pivoted, its motion is transmitted to movable conduit section 210 through link 260. Thus, when handle 252 is pivoted towards upstream discharge conduit 300, movable conduit section 210 moves away from upstream discharge conduit 300 to open discharge manifold 200; and when handle 252 is rotated away from upstream discharge conduit 300, movable conduit section 210 moves away from upstream discharge conduit 300 to close discharge manifold 200, and upstream discharge conduit 300. Movable conduit section 210 can be fully engaged, fully disengaged, or any position in between, depending upon the amount handle 252 is rotated. A gauge (not shown) can be provided on platform 250 (e.g. at the slot) to indicate by the position of handle 252 what percentage discharge manifold 200 is open.

Platform 250 has an upstream end 262 and a downstream end 264. A first block 270 joins upstream end 262 to upstream discharge conduit 300 and also acts as a stop for discharge manifold 200 in it full closed position. A second block 272 extends downwardly from downstream end 264 of platform 250 and acts as a stop for discharge manifold 200 in the full open position.

A circumferential discharge channel 290 is provided at downstream end 276 immediately adjacent the termination of the taper in edge 314 of upstream discharge conduit 300 to receive the fluid of lighter specific gravity circulating adjacent inner surface 320 of upstream discharge conduit 300 when discharge manifold 200 is open. A discharge port 292 opens into discharge channel 290 for receiving and discharging water from discharge channel 290.

Movable conduit section 210 is connected at its outlet end 214 to downstream discharge conduit 400 with a seal 500 as shown in FIG. 2. Referring now to FIG. 2, the operation of the invention will be described with reference of the delivery of diesel or jet fuel from a transport ship, which fuel has been contaminated by sea water. However, it should be understood that application of the invention is not limited to the separation of water and fuel or to use in the context of fuel transport ships, but can be used for the separation of any two fluids having different specific gravities, e.g. oil and water where water is the primary fluid, sludge and treated water in a water purification system, or in reverse osmosis.

In operation, the fluids in their unseparated state are fed into inlet 122 of drum 110, which is supported by the magnetic bearings 180 As blades 140 rotate, the water W (which has a heavier specific gravity than the fuel L swirls in a vortex adjacent the inner surface 320 of upstream discharge conduit 300. The fuel F, as the primary fluid, occupies the entire flow line. It is noted that, if the water W were the primary fluid, the water W, which then becomes F in FIG. 5, would still migrate to the perimeter, but the low pressure initiated by hollow core 150 would cause the fuel, in this instance L (which has a lighter specific gravity) to be compressed into a tight core around the axis of upstream discharge conduit 300, as shown in dotted lines in FIG. 5. However, if the water W were the primary fluid, then discharge manifold 200 would be replaced by a different discharge manifold, which does not constitute a part of this invention.

With discharge manifold 200 in the full open position, the water W will flow between edge 314 of upstream discharge conduit 300 and edge 216 of movable conduit section 210 into discharge channel 290, and out through discharge port 292, resulting in the general flow pattern shown in FIG. 5. The fuel F, separated from the water W, will continue to flow through discharge manifold 200 and out through downstream discharge conduit 400 to its destination.

Thus, it will be seen that the present invention provides a unique method for separating immiscible fluids having different specific gravities. While a preferred embodiment of the invention has been disclosed, it should be understood that the spirit and scope of the invention are to be limited solely by the appended claims, since numerous modifications of the disclosed embodiment will undoubtedly occur to those of skill in the art.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for separating a fluid having a lighter specific gravity from a fluid having a heavier specific gravity, comprising:
   a tubular rotatable drum mounted on magnetic bearings, the rotatable drum having a drum inlet and a drum outlet;
   a discharge conduit connected to said drum outlet;
   a rotatable impeller positioned in the rotatable drum;
   a discharge manifold coupled to the discharge conduit, wherein the discharge conduit has an outwardly tapered edge that engages with an inwardly tapered edge of the discharge manifold to define an outlet; and
   a housing around said rotatable drum, wherein said drum inlet and said housing together define an inlet solids discharge port, and wherein said drum outlet and said housing together define an outlet solids discharge port.

2. The apparatus of claim 1, wherein the magnetic bearings rotatably support the rotatable drum, each magnetic bearing comprising a bearing stator through which a rotor passes, the stator comprising an upper winding directly above the rotor and a lower winding directly below the rotor, a current in each winding being controlled by a microprocessor that runs a control algorithm program.

3. The apparatus of claim 2, wherein the rotor and the housing together define an inlet solids receiving chamber, the inlet solids receiving chamber having an inlet solids discharge port for draining solids collected in the inlet solids receiving chamber, and the rotor and the housing together define an outlet solids receiving chamber, the outlet solids receiving chamber having an outlet solids discharge port for draining solids collected in the outlet solids receiving chamber.

4. The apparatus of claim 1, additionally comprising an outlet discharge pipe in fluid communication with the outlet solids discharge port and an inlet discharge pipe in fluid communication with the inlet solids discharge port.

5. The apparatus of claim 1, wherein the impeller comprises at least two concentric helical blades each having an inlet end and an outlet end.

6. An apparatus for separating a fluid having a lighter specific gravity from a fluid having a heavier specific gravity and for separating fluids having lighter specific gravity from solids having a heavier specific gravity, comprising:

a tubular rotatable drum rotatably mounted on magnetic bearings, the rotatable drum having a drum inlet and a drum outlet;

a discharge conduit connected to the drum outlet;

a rotatable impeller positioned in the rotatable drum; and a discharge manifold coupled to the discharge conduit for selectively discharging the fluids and solids of each given layer of the mixture stream; and a housing around the rotatable drum, together with the drum inlet defining an inlet gap, the housing having an inlet solids receiving chamber fluidly coupled to an inlet solids discharge port for draining solids collected in the inlet solids receiving chamber; and the inlet gap opening into the inlet solids receiving chamber;

the impeller comprising at least two concentric helical blades each having an inlet end and an outlet end.

7. The apparatus of claim 6, additionally comprising an inlet discharge pipe in fluid communication with the inlet solids discharge port.

8. The apparatus of claim 6, wherein the magnetic bearings rotatably support and axially position said drum, each magnetic bearing comprising a bearing stator through which a rotor passes, the stator comprising an upper winding directly above the rotor and a lower winding directly below the rotor, a current in each winding being controlled by a microprocessor that runs a control algorithm program, the stator further comprising upper and lower rotor position sensors connected to the microprocessor to feed rotor position information to the algorithm program in the microprocessor to provide real time feedback to permit continuous adjustment of electric current through the upper winding and the lower winding.

9. An apparatus for separating a fluid having a lighter specific gravity from a fluid having a heavier specific gravity and for separating fluids having lighter specific gravity from solids having a heavier specific gravity, comprising:

a tubular rotatable drum having a drum inlet and a drum outlet;

a discharge conduit connected to the drum outlet;

a rotatable impeller positioned in the rotatable drum;

a discharge manifold coupled to the discharge conduit for selectively discharging the fluids and solids of each given layer of a mixture stream; and a housing around the rotatable drum that together with the drum inlet defines an inlet solids discharge gap and together with the drum outlet defines an outlet solids discharge gap.

10. The apparatus of claim 9, wherein the impeller comprises at least two concentric helical blades each having an inlet end and an outlet end.

11. The apparatus of claim 9, additionally comprising an outlet discharge pipe in fluid communication with the outlet solids discharge gap.

12. The apparatus of claim 9, wherein each magnetic bearing comprises a bearing stator through which a rotor passes, and the rotor and the housing together define an inlet solids receiving chamber coupled to the inlet solids discharge gap and an outlet solids receiving chamber coupled to the outlet solids discharge gap.

13. The apparatus of claim 12, wherein the inlet solids receiving chamber is coupled to an inlet solids discharge port and an inlet solids discharge pipe in fluid communication with the inlet solids discharge port, and the outlet solids receiving chamber is coupled to an outlet solids discharge port and an outlet solids discharge pipe in fluid communication with the outlet solids discharge port.

14. The apparatus of claim 9, wherein the discharge conduit has an outwardly tapered edge that engages with an inwardly tapered edge of the discharge manifold to define an outlet.

* * * * *